Oct. 8, 1940.    C. R. STOUGH    2,217,081
VEHICLE WHEEL
Filed Jan. 20, 1939    2 Sheets-Sheet 1

INVENTOR.
CHARLES R. STOUGH.
BY
Carroll R. Taber
ATTORNEY.

Oct. 8, 1940.  C. R. STOUGH  2,217,081
VEHICLE WHEEL
Filed Jan. 20, 1939   2 Sheets-Sheet 2

INVENTOR.
CHARLES R. STOUGH
BY Carroll R. Taber
ATTORNEY.

Patented Oct. 8, 1940

REISSUED
NOV 25 1941

2,217,081

UNITED STATES PATENT OFFICE 2,217,081

VEHICLE WHEEL

Charles R. Stough, Lansing, Mich., assignor to Motor Wheel Corporation, Lansing, Mich., a corporation of Michigan Application January 20, 1939, Serial No. 251,904

11 Claims. (Cl. 301—9)

This invention relates to vehicle wheels and more particularly to pressed metal wheels of the reversible type.

It is an object of this invention to provide a wheel having a dished wheel body which is adapted to be mounted on a hub with either face of the wheel body out, whereby to vary the wheel tread of the vehicle on which it is used. Another object of the invention is to provide a wheel of the character described so constructed that a firm yet resilient bearing on the hub is provided. A still further object of the invention is the provision of a wheel having stiffening ribs on the wheel body for strengthening the central portion thereof.

These objects and others ancillary thereto will become more apparent in the following specification when read in connection with the accompanying drawings forming a part of this application.

In general the invention contemplates the provision of a pressed metal wheel having a central bolting on portion axially offset to one side of the periphery of the wheel body and adapted to be mounted with either face out, whereby the wheel tread may be varied by reversing the position of the wheel. The central portion or bolting on flange of the wheel body is provided with a plurality of staggered ribs or bosses arranged to extend in axially opposite directions from the plane of the bolting on flange of the wheel. The bolting on flange is provided with apertures for the reception of bolts or cap screws for demountably securing the wheel body to the hub, and the apertures are inwardly tapered from both faces of the wheel body. The bosses are arranged with respect to the apertures so that the portions of the bolting on flange surrounding the apertures are spaced from the hub flange in either position of the wheel body. When the securing bolts are drawn up tightly the aforementioned portions surrounding the apertures are stressed, thus preventing the securing bolts from accidentally working loose.

Figure 1:
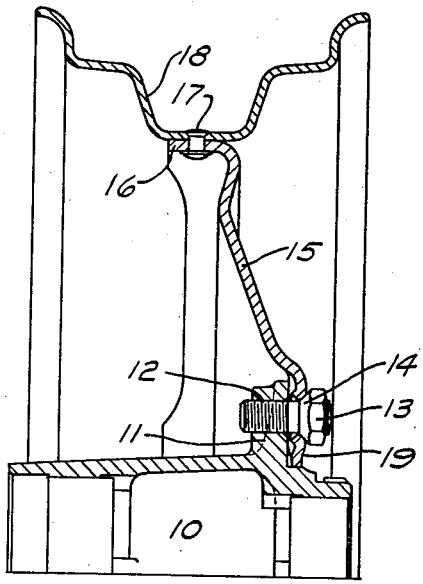
Figure 1 is a radial sectional view of a vehicle wheel embodying this invention.
Figure 2:
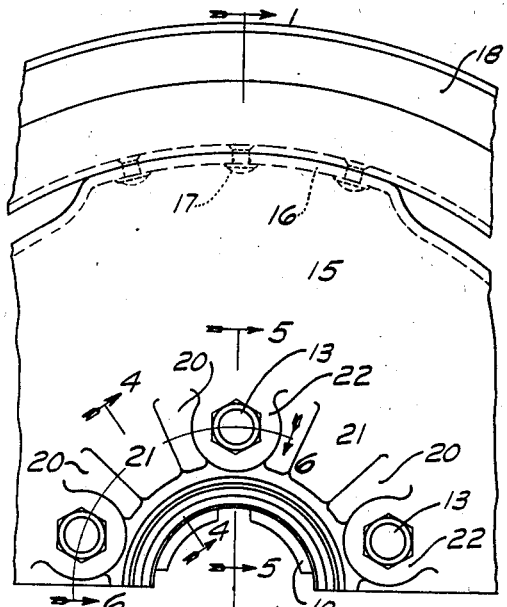
Figure 2 is a fragmentary elevational view of the wheel shown in Figure 1.

Referring now more particularly to the drawings, Figures 1 and 2 disclose a portion of a wheel embodying the present invention. The wheel shown includes a hub 10 having a radial flange 11 provided with a plurality of circumferentially spaced tapped holes 12 located concentrically with respect to the axis of the hub. These apertures 12 are adapted to receive threaded cap screws 13. The inner faces of the heads of the cap screws 13 are tapered to form shoulders 14.

Figure 3:
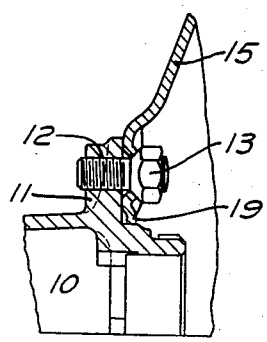
Figure 3 is a fragmentary sectional view of the wheel but showing the wheel body reversed from the position shown in Figure 1.
Figures 4, 5:
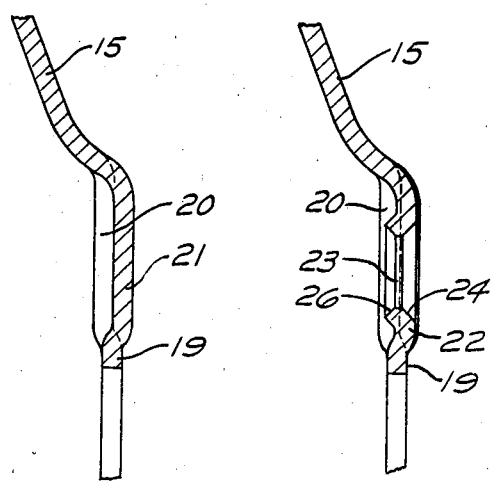
Figure 4 is a fragmentary cross sectional view of the wheel body taken on substantially the line 4—4 of Figure 2.
Figure 5 is a fragmentary cross sectional view of the wheel body taken on substantially the line 5—5 of Figure 2.

A pressed metal wheel body 15 is provided with a peripheral flange 16 which is permanently secured by means of rivets 17 to a rim 18 of the drop center type. The central portion of the wheel body 15 consists of a radially extending bolting on flange 19 which is offset axially relative to the peripheral flange 16. The bolting on flange is demountably secured to the hub flange 11 by means of the cap screws 13. Due to the offset construction of the bolting on flange 19, it will be apparent that the location of the rim 18 in relation to the flange may be changed by merely reversing the position of the bolting on flange 19. Figure 1 shows the wheel body in one position, and Figure 3 shows the wheel body in the other position. This arrangement is desirable in industrial and farm machinery where it is desirable to vary the tread of the vehicle wheels. It is particularly necessary in the case of cultivating machinery where the rows of plants to be cultivated vary in spacing.

Figure 6:
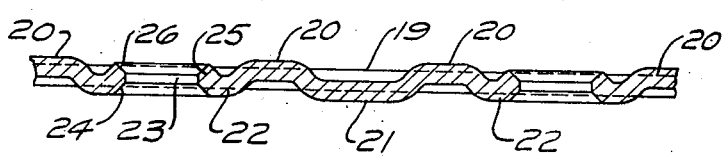
Figure 6 is a sectional view taken on substantially the line 6—6 of Figure 2.

In wheels of the type demountable at the hub there should be some provision for stressing the material surrounding the bolt holes when the wheel body is clamped to the hub in order to provide a tight connection and prevent the cap screws from working loose. In addition, it is desirable that the central portion of the wheel body be relatively rigid in a radial direction. With these objects in view, the bolting on flange of the wheel body is corrugated or provided with a plurality of alternately oppositely extending bosses 20 and 21, and ribs 22. Figure 6, which is a sectional view taken on substantially the bolt circle of the wheel body, discloses the relative positions of the various bosses and ribs. The ribs 22 have openings 23 therein for the reception of the cap screws 13, and the metal immediately surrounding the apertures 23 is pressed inwardly thereby forming a conical seat 24 of the same inclination as the shoulders 14 on the cap screws 13. When the metal around the openings 23 is pressed inwardly, as described, to form the seat 24, a circular protuberance 25 is formed on the opposite side of the wheel. This protuberance is machined about the apertures 23 to provide a seat 26 of the same inclination as the seat 24.

Intermediate each pair of ribs 22 is a boss 21 which is separated from the ribs 22 by a pair of bosses 20. The latter extend in a direction axially opposite to the bosses 21. It will be noted that the bosses 20 extend away from the plane of the bolting on flange 19 a distance slightly greater than the extremity of the protuberances 25, and the bosses 21 extend in the same direction as the ribs 22 but to a slightly greater extent.

It will be apparent that when the wheel body is mounted as in Figure 1, the protuberances 25 will not touch the hub flange, but the bosses 20 will contact the hub flange. Therefore, when the cap screws 13 are inserted in the apertures 23 and 12 and threaded home, the bolting on flange 19 is flexed until the protuberances 25 contact the hub flange. In other words, the portions of the bolting on flange 19 around the bolt holes 23 are bent slightly about the bosses 20 as fulcrums, thereby stressing the flange 19.

Likewise, when the wheel body is mounted as in Figure 3, the bosses 21 initially contact the hub flange and the ribs 22 are spaced from the hub flange. When the cap screws are threaded home, the bolting on flange is flexed until the ribs 22 contact the hub flange. Consequently, the portions of the bolting on flange around the holes 23 are bent about the bosses 21 as fulcrums to stress the flange 19 in that region.

In addition to providing a means for stressing the flange 19, the bosses 20 and 21 and ribs 22 stiffen the wheel body in a radial direction, thereby reducing the possibility of springing the wheel and causing it to wobble.

Figures 7 to 11 illustrate a modified form of the invention. In general the wheel is the same as that described previously, but it differs somewhat in the configuration of the bolting on flange. The main purpose of the two modifications is the same, that is, to provide a reversible wheel body equipped with bosses in order to give a resilient bearing between the securing bolts and the bolting on flange.

Figure 7:
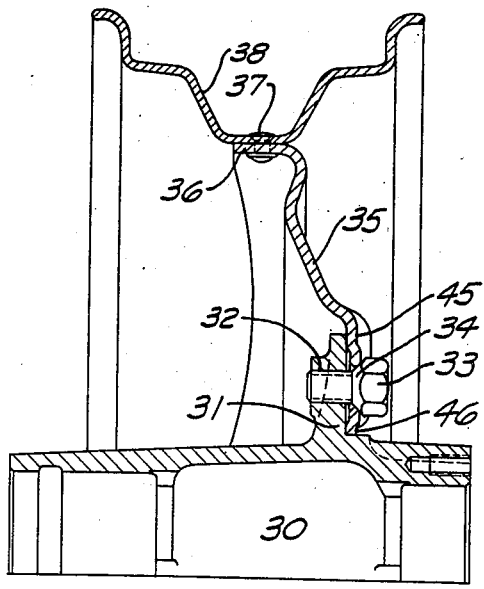
Figure 7 is a view of a modified form of the invention, the figure being a cross section taken on substantially the line 7—7 of Figure 8.

The wheel of Figure 7 has the usual hub 30 which has a radial flange 31 to which the wheel body is secured. The flange 31 is provided with tapped holes 32 for the reception of cap screws 33 for demountably securing the wheel body 35 to the hub. The cap screws 33 have tapered shoulders 34.

The wheel body 35 is formed from pressed metal and has a peripheral flange 36 which is secured by means of rivets 37 to a conventional drop center rim 38. The wheel body 35 has a bolting on flange 39 which is offset axially from the peripheral flange 36.

Figures 10, 11:
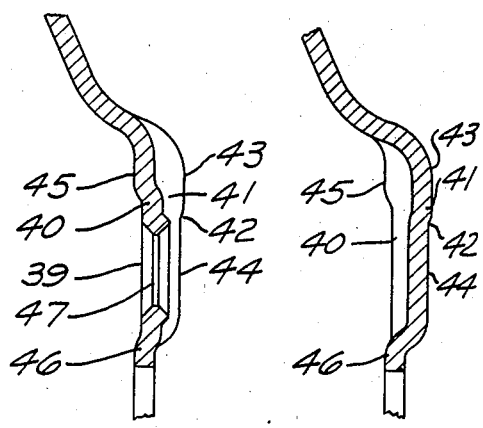
Figure 10 is a fragmentary cross sectional view of the wheel body taken on substantially the line 10—10 of Figure 8.
Figure 11 is a fragmentary cross sectional view of the wheel body taken on substantially the line 11—11 of Figure 8.

The bolting on flange 39 is provided with a plurality of bosses which are pressed axially from the plane thereof in order to provide for the proper contact between the bolting on flange 39 and the hub flange 31. The original plane of the bolting on flange is indicated in Figures 10 and 11 at 40. At angularly spaced intervals about the bolting on flange are bosses 41 which are pressed axially away from the original plane of the bolting on flange in one direction. As will be noted particularly from Figure 8, the bosses are located intermediate the bolt holes and terminate a short distance away therefrom. These bosses are not exactly flat but are relieved or undercut at 42 whereby to provide two portions 43 and 44 which are slightly offset from each other in an axial direction. The purpose of this offset will appear more fully hereinafter.

Intermediate the bosses 41 and radially outwardly of the bolt holes the bolting on flange is pressed in a direction opposite to the bosses 41 in order to provide bosses 45. The radially inner edge of the flange 39 is also pressed in the same direction as the bosses 45 whereby an annular ring 46, which in effect is an additional boss, is formed. The ring 46 is, as above stated, pressed in the same direction as the boss 45 but not quite to the same extent, so that the left hand faces of the ring 46 and the bosses 45, as viewed in Figure 10, are not quite in the same plane.

The bolt holes 47 are tapered inwardly from both ends to form conical seats for the reception of the tapered shoulders 34 of the cap screws. The formation of these holes is the same as that described in the previous modification.

As above stated, the wheel body may be mounted on the hub with either face of the wheel body outward. When mounted in the position shown in Figure 7, the bosses 45 and the ring 46 contact the outer face of the flange 31. Because the faces of the bosses 45 and the ring 46 are not in the same plane, the bosses 45 will contact the flange 31 before the ring 46 will do so. Consequently, the bolting on flange is flexed slightly when the cap screws 33 are drawn up tightly. In addition to this flexing of the entire bolting on flange, there is some flexing of the portion of the flange immediately surrounding the bolt holes 47, or in other words, those portions intermediate the bosses 45 and the ring 46.

Figure 9:
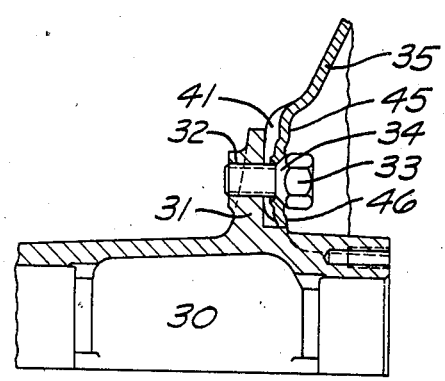
Figure 9 is a fragmentary sectional view similar to Figure 7, but showing the wheel body reversed from the position disclosed in Figure 7.

When the wheel is mounted in the reverse position, as in Figure 9, the bosses 41 provide the sole contact between the bolting on flange and the hub flange. When mounting the wheel body in this position the radially outer portions 43 of the bosses 41 contact the hub flange before the inner portions 44 and thereby permit a slight amount of flexing of the bolting on flange as the portions 44 are drawn against the hub flange 31. In addition to this flexing, there is an additional flexing of the bolting on flange in the portions between the circumferentially spaced bosses 41.

The flexing of the bolting on flange, or certain parts thereof, is in a direction axially of the wheel. However, when the wheel body is mounted in one position the wheel body is flexed between radially spaced points. If mounted in the other position the flexing of the wheel body occurs between radially spaced points and circumferentially spaced points.

Figure 8:
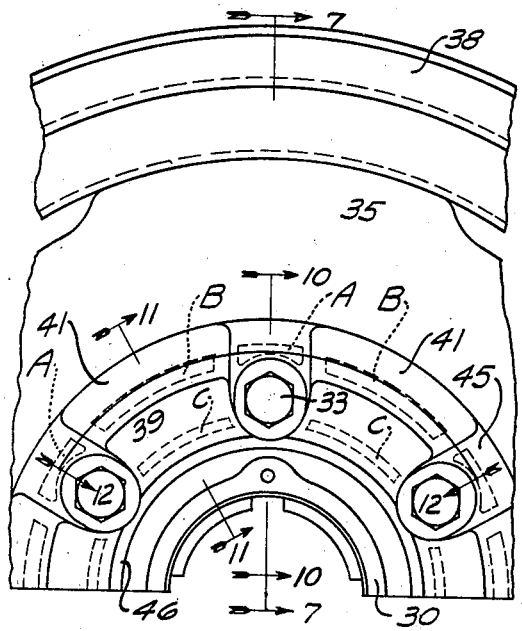
Figure 8 is a fragmentary elevational view of the wheel shown in Figure 7.
Figure 12:
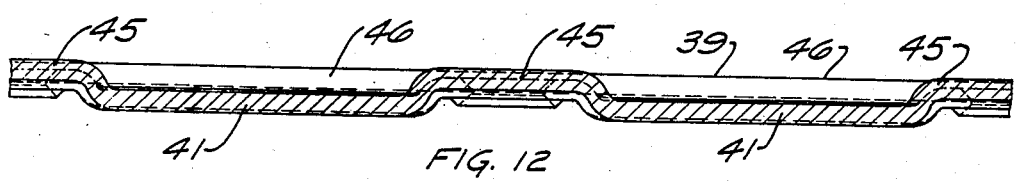
Figure 12 is a fragmentary sectional view taken on substantially the line 12—12 of Figure 2.

In Figure 8 the areas of contact between the flanges 31 and 39 are indicated. When the wheel body is mounted as shown in Figure 7 the bolting on flange 39 contacts the hub flange 31 in the dotted areas A and also at the surface of the ring boss 46. When the wheel body is mounted in the reversed position, or that shown in Figure 9, the flange 39 contacts flange 31 in the dotted areas B and C.

It will be evident from the foregoing that the wheels described herein are capable of being mounted in either of two positions, and that due to the particular formation of the bosses on the bolting on flanges the wheel bodies are sprung slightly when they are clamped in place on the hub flange. Therefore, there will be slight possibility of a cap screw working loose in service. Furthermore, the bosses stiffen the wheel in a radial direction, thereby making a more solid wheel than those without ribs.

The scope of the invention is indicated in the appended claims.

I claim:

1. A reversible wheel including, in combination, a substantially planar hub flange provided with a plurality of circumferentially spaced apart openings, a one piece wheel flange provided with a plurality of corresponding circumferentially spaced apart openings, and securing means adapted to be received in said openings for detachably clamping the wheel flange to the hub flange, each of the openings in the wheel flange being formed in a substantially planar zone thereof, the wheel flange being provided at opposite sides of each opening with a pair of spaced apart projections extending axially outward from one face of said planar zone and a second pair of spaced apart projections extending axially outward from the opposite face of said planar zone, all of said projections being spaced from the adjacent opening a substantial distance whereby the wheel flange is flexed in said planar zones when either side of the wheel flange is clamped to the hub flange by said securing means.

2. A wheel as defined in claim 1, wherein one pair of said projections are arranged at radially opposite sides of the adjacent opening.

3. A wheel as defined in claim 1, wherein one pair of said projections are arranged at circumferentially opposite sides of the adjacent opening.

4. A wheel as defined in claim 1, wherein one of said projections is circumferentially continuous.

5. A wheel as defined in claim 1, wherein there are two projections extending in one axial direction and one projection extending in the other axial direction between adjacent openings.

6. A wheel as defined in claim 1, wherein at least some of said projections are in the form of circumferentially extending ribs of limited circumferential extent.

7. A wheel as defined in claim 1, wherein at least some of said projections are in the form of radial ribs of limited radial extent.

8. A wheel as defined in claim 1, wherein all of said projections are integral with the wheel flange.

9. A wheel as defined in claim 1, wherein one pair of said projections are circumferentially elongated and the other pair are radially elongated.

10. A wheel as defined in claim 1, wherein all of said projections are radially elongated.

11. A reversible wheel including, in combination, a substantially planar hub flange provided with a plurality of circumferentially spaced part openings, a one piece radially extending wheel flange having a plurality of corresponding circumferentially spaced apart openings, and securing means adapted to be received in said openings for detachably clamping the wheel flange to the hub flange, each of the openings in the wheel flange being formed in a substantially planar zone thereof, the wheel body being offset axially outward from one face of said planar zone on opposite sides of each of said openings, and offset axially outwardly from the opposite face of said planar zone on opposite sides of each of said openings, all of said offsets being spaced from the adjacent opening whereby the wheel flange is flexed in said planar zones when either side of the wheel flange is clamped to the hub flange by said securing means.

CHARLES R. STOUGH.